(12) United States Patent
Jewitt

(10) Patent No.: US 6,678,073 B1
(45) Date of Patent: Jan. 13, 2004

(54) ERROR DIFFUSION METHOD AND APPARATUS

(75) Inventor: Thomas W. Jewitt, Ayer, MA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/500,146

(22) Filed: Feb. 8, 2000

(51) Int. Cl.⁷ .................. H04N 1/405; H04N 1/409
(52) U.S. Cl. ............................ 358/3.04; 358/3.26
(58) Field of Search ........................ 358/3.04, 3.03, 358/3.02, 1.9, 3.26; 382/252

(56) References Cited

U.S. PATENT DOCUMENTS

| | | | |
|---|---|---|---|
| 4,339,774 A | | 7/1982 | Temple .................. 358/3.03 |
| 4,733,230 A | | 3/1988 | Kurihara et al. .......... 358/3.03 |
| 4,924,322 A | | 5/1990 | Kurosawa et al. ........ 358/3.04 |
| 4,955,065 A | | 9/1990 | Ulichney ................ 382/270 |
| 5,045,952 A | | 9/1991 | Eschbach ............... 358/3.03 |
| 5,055,942 A | | 10/1991 | Levien ................ 358/3.03 |
| 5,077,812 A | | 12/1991 | Kanno et al. ............ 382/252 |
| 5,226,094 A | | 7/1993 | Eschbach ............... 382/252 |
| 5,226,096 A | | 7/1993 | Fan .................... 382/252 |
| 5,243,443 A | | 9/1993 | Eschbach ............... 358/3.03 |
| 5,317,653 A | * | 5/1994 | Eschbach et al. .......... 358/3.05 |
| 5,353,127 A | | 10/1994 | Shiau et al. ............ 382/252 |
| 5,467,201 A | * | 11/1995 | Fan .................... 358/3.03 |
| 5,521,989 A | * | 5/1996 | Fan .................... 382/252 |
| 5,621,542 A | * | 4/1997 | Ohta et al. ............. 358/3.03 |
| 6,091,858 A | * | 7/2000 | Yoshida ................ 382/252 |
| 6,195,468 B1 | * | 2/2001 | Yoshida ................ 382/270 |
| 6,271,936 B1 | * | 8/2001 | Yu et al. ............... 358/3.04 |

* cited by examiner

Primary Examiner—Scott Rogers
(74) Attorney, Agent, or Firm—Testa, Hurwitz & Thibeault, LLP

(57) ABSTRACT

The invention relates to a method of diffusing error caused by quantizing each pixel within an image formed of a plurality of pixels, each pixel representing a greyscale value of the image at a location (n, l) within the image, and having an original greyscale value associated therewith. The method includes the steps of adding to the original greyscale value of a pixel having a position (n, l) within the image a first error term resulting from quantization of previously processed pixels to derive a modified greyscale value, comparing the modified greyscale value of the pixel with a threshold to select an output value representing the pixel, calculating a second error term having a value that is the difference between the output value and the modified greyscale value, and distributing the second error term to a preselected plurality of neighboring pixels at positions (n+1, l), (n−1, l+1), (n, l+1), (n+1, l+1) using a linear phase filter algorithm having a set of distribution coefficients with a sum less than one, wherein one coefficient within the set of coefficients is combined with the second error term for each pixel position. The method also includes these steps being repeated for each pixel within the image. In another embodiment, the portion of the second error term distributed to the pixel at position (n+1, l+1) equals the portion of the second error term distributed to the pixel at position (n−1, l+1).

24 Claims, 5 Drawing Sheets

*Normalized over 256

|  | n, l | n+1, l |
|---|---|---|
|  | $\epsilon$ | 124$\epsilon$ |
| 31$\epsilon$ | 62$\epsilon$ | 31$\epsilon$ | n-1, l+1   n, l+1   n+1, l+1

*Normalized over 256

Fig. 4

ERROR DIFFUSION METHOD AND APPARATUS

FIELD OF THE INVENTION

The invention relates generally to the field of printing. More specifically, the invention relates to a method and apparatus for distributing the error resulting from quantizing the pixels of an image.

BACKGROUND OF THE INVENTION

Image information (whether color or black and white) is commonly derived by scanning in a greyscale format containing a large number of levels (e.g., 256 levels for black and white and more than 16 million levels for color). The resulting image is often unprintable by standard printers. Standard printers print in a limited number of levels. In the binary case, a printer prints at two levels, either a spot or no spot. In a quaternary case, four levels are printed, which may correspond to no spot or one of three different spot sizes. Greyscale image data may be represented in a very large number of values. Accordingly, it is necessary to reduce greyscale image data to the limited number of levels to enable a printer to print the image.

One standard method of converting greyscale pixel image data to binary level pixel image data is through the use of dithering or halftoning processes. In such processes, each greyscale pixel within a given area is compared to one of a set of preselected thresholds comprising a matrix of threshold values (or a halftone cell). The effect of such an arrangement is that for an area where the image is gray, some of the thresholds within the matrix are exceeded, while others are not. In the binary case, the portions of the matrix (or cell elements) in which the thresholds are exceeded are printed as black, while the remaining elements remain white. The effect of the distribution of black and white over the cell is integrated by the human eye as a shade of gray.

Dithering presents problems in that the amount of gray within an original image is not maintained exactly over an area because the finite number of elements inside each halftone cell only allows the reproduction of a finite number of greyscale levels. The error arising from the difference between the threshold value and the actual greyscale value at any particular cell is simply thrown away. This results in loss of image information and the formation of image artifacts. A known example is the banding (or false contour) artifact that can be seen in smooth image areas. The image input greyscale varies smoothly over an image area, while the halftoned image has to make a transition from one halftone dot (greyscale) to another. This transition can clearly be seen as a band running through smooth image parts. Also, these errors create undesirable textures and long range patterns, often referred to as worms.

Algorithms that convert grayscale images to binary or other number of level images attempting to preserve gray density are known. Known error diffusion methods attempt to maintain gray by making the conversion from gray pixels to binary or other level pixels on a pixel-by-pixel basis. The methods compare each pixel to a threshold, and the difference between the greyscale pixel value and the threshold is distributed to a selected group of neighboring pixels in accordance with a weighting method. The adjusted image pixels are then fed back as inputs to the processing method. In this way, the error calculated includes all errors previously distributed.

One example is an error diffusion algorithm, as taught in "An Adaptive Algorithm for Spatial Greyscale" by Floyd and Steinberg, Proceedings of the SID 17/2, 75–77 (1976) (hereinafter, "Floyd and Steinberg"). The Floyd and Steinberg method proposes distribution of error determined in the quantization of the nth pixel in scan line l (i.e., pixel position n, l) for the distribution matrix including pixels at pixel locations corresponding to pixels {(n+1, l), (n−1, l+1), (n, l+1), (n+1, l+1)}. Distribution weighting in accordance with the method is given by {(n+1, l)=0.4375, (n−1, l+1)=0.1875 (n, l+1)=0.3125 (n+1, l+1)=0.0625}. See FIG. 1 for a block diagram representation of the Floyd and Steinberg error distribution coefficients.

An alternative error diffusion method is taught in "Images from Computers," by M. R. Schroder (sometimes spelled Schroeder) in IEEE Spectrum, pp. 66–78 (1969) (hereinafter Schroder). In this method, the error is only calculated between the original input pixel and the output, neglecting all previously distributed errors. This method leads to a poorer greyscale representation than the Floyd and Steinberg approach, but to higher image contrast. Modifications to the algorithm by Schroder are taught in "Design of Optimal Filters for Error-Feedback Quantization of Monochrome Pictures" by Jung Guk Kim and Gil Kim, Information Sciences 39, pp. 285–298 (1986).

In representing small variations in image appearance with an error diffusion technique, large areas of the image are required for the variation to be represented. Thus, while error diffusion is effective in maintaining gray over the image, it requires a rather large area of the image for the error compensation to be effective. Over such areas, undesirable textures and long-range patterns (e.g., worms), inherent in the distribution of error, may occur. Such artifacts particularly appear in the highlight and shadow areas of an image rendered with the original coefficient set proposed by Floyd and Steinberg.

Other error diffusion methods have been proposed that have more complex and elaborate error diffusion techniques. These other techniques still result in images with worms and can require significant computational resources to implement. These techniques also conserve intensity, resulting in propagating the errors over the entire image, instead of keeping the errors localized. A need exists for a simple error distribution method that keeps the error localized and avoids elements, (e.g., worms) that are caused by phase distortion.

SUMMARY OF THE INVENTION

This invention relates to methods and apparatus of diffusing error caused by quantizing each pixel within an image formed of a plurality of pixels. This invention utilizes simple error processing, thus minimizing the computing resources necessary to implement. By implementing a simple error processing with lossy and linear phase characteristics, this invention keeps errors localized and eliminates worms and random noise that degrades a printed image.

In one aspect, the invention relates to a method of diffusing error caused by quantizing each pixel within an image formed of a plurality of pixels, each pixel representing a greyscale value of the image at a location (n, l) within the image, and having an original greyscale value associated therewith. The method includes the steps of adding to the original greyscale value of a pixel having a position (n, l) within the image a first error term resulting from quantization of previously processed pixels to derive a modified greyscale value, comparing the modified greyscale value of the pixel with a threshold to select an output value representing the pixel, calculating a second error term having a value that is the difference between the output value and the modified greyscale value, and distributing the second error term to a preselected plurality of neighboring pixels at positions (n+1, l), (n−1, l+1), (n, l+1), (n+1, l+1) using a linear phase filter algorithm having a set of distribution coefficients with a sum less than one, wherein one of the coefficients within the set of coefficients is combined with the second error term for each pixel position. The method also includes these steps being repeated for each pixel within the image. In another embodiment, the linear phase filter algorithm uses finite impulse response techniques. In another embodiment, the combining of one coefficient with the second error term for each pixel position is accomplished by multiplying each coefficient by the second error term. In another embodiment, the portion of the second error term distributed to the pixel at position (n+1, l+1) equals the portion of the second error term distributed to the pixel at position (n−1, l+1). In another embodiment, the portion of the second error term distributed to the pixel at position (n−1, l+1) combined with the portion of the second error term for the pixel at position (n+1, l+1) equals the portion of the second error term for the pixel at position (n, l+1). In another embodiment, the portion of the second error term distributed to the pixel at position (n+1, l) equals the sum of the portion of the second error term of the pixel at position (n+1, l+1) combined with the portion of the second error term of the pixel at position (n, l+1) and combined with the portion of the second error term of the pixel at position (n−1, l+1). In another embodiment, the portion of the second error term distributed to the pixel at position (n+1, l) is about 0.484375, the portion of the second error term distributed to the pixel at position (n−1, l+1) is about 0.12109375, the portion of the second error term distributed to the pixel at position (n, l+1) is about 0.2421875 and the portion of the second error term distributed to the pixel at position (n+1, l+1) is about 0.12109375. In another embodiment, the order in which the pixels are processed is determined using raster scanning. In another embodiment, the order in which the pixels are processed is determined using serpentine scanning.

In another aspect, the invention features a method of diffusing error caused by quantizing each pixel within an image formed of a plurality of pixels, each pixel representing a greyscale value of the image at a location within the image, and having an original greyscale value associated therewith. This method includes the steps of adding to the original greyscale value of a pixel having a position (n, l) within the image a first error term resulting from quantization of previously processed pixels to derive a modified greyscale value, comparing the modified greyscale value of the pixel with a threshold to select an output value representing the pixel, calculating a second error term having a value that is less than the difference between the output value and the modified greyscale value, and distributing the second error term to a preselected plurality of neighboring pixels at positions (n+1, l), (n−1, l+1), (n, l+1), (n+1, l+1), wherein the portion of the second error term distributed to the pixel at position (n+1, l+1) equals the portion of the second error term distributed to the pixel at position (n−1, l+1), and the portion of the second error term distributed to the pixel at position (n−1, l+1) combined with the portion of the second error term for the pixel at position (n+1, l+1) equals the portion of the second error term for the pixel at position (n, l+1), and the portion of the second error term distributed to the pixel at position (n+1, l) equals the sum of the portion of the second error term of the pixel at position (n+1, l+1) combined with the portion of the second error term of the pixel at position (n, l+1) and combined with the portion of the second error term of the pixel at position (n−1, l+1). These steps are repeated for each pixel within the image. In another embodiment, the order in which the pixels are processed is determined using raster scanning. In another embodiment, the order in which the pixels are processed is determined using serpentine scanning. In another embodiment, the portion of the second error term distributed to the pixel at position (n+1, l) is about 0.484375, the portion of the second error term distributed to the pixel at position (n−1, l+1) is about 0.12109375, the portion of the second error term distributed to the pixel at position (n, l+1) is about 0.2421875 and the portion of the second error term distributed to the pixel at position (n+1, l+1) is about 0.12109375.

In another aspect, the invention features an error diffusion system for diffusing error caused by quantizing each pixel within an image formed of a plurality of pixels, each pixel representing a greyscale value of the image at a location (n, l) within the image, and having an original greyscale value associated therewith. The system includes a first summing module for adding to the original greyscale value of a pixel having a position (n, l) within the image a first error term resulting from quantization of previously processed pixels to derive a modified greyscale value, a second summing module operatively connected to the output of the first summing module and the output of the quantizer for calculating a second error term having a value that is less than the difference between the output value and the modified greyscale value, a quantizer operatively connected to the output of the first module comparing the modified greyscale value of the pixel with a threshold to select an output value representing the pixel, and an error filter module operatively connected to the input of the first summing module and the output of the second summing module for distributing the second error term, to preselected plurality of neighboring pixels at positions (n+1, l), (n−1, l+1), (n, l+1), (n+1, l+1) using a linear phase filter algorithm having a set of distribution coefficients with a sum less than one, wherein one of the coefficients within the set of coefficients is combined with the second error term for each pixel position. In another embodiment, the linear phase filter algorithm of the error filter module uses finite impulse response techniques. In another embodiment, the combining of one coefficient with the second error term for each pixel position is accomplished by multiplying each coefficient by the second error term. In another embodiment, the error filter module further distributes the second error term such that the pixel at position (n+1, l+1) equals the portion of the second error term distributed to the pixel at position (n−1, l+1). In another embodiment, the error filter module further distributes the second error term such that the pixel at position (n−1, l+1) combined with the portion of the second error term for the pixel at position (n+1, l+1) equals the portion of the second error term for the pixel at position (n, l+1). In another embodiment, the error filter module further distributes the second error term such that the pixel at position (n+1, l) equals the sum of the portion of the second error term of the pixel at position (n+1, l+1) combined with the portion of the second error term of the pixel at position (n, l+1) and combined with the portion of the second error term of the pixel at position (n−1, l+1). In another embodiment, the error filter module further distributes the second error term to preselected plurality of pixels, including pixels at positions (n+1, l), (n−1, l+1), (n, l+1), (n+1, l+1), such that the portion of the second error term distributed to the pixel at position (n+1, l) is about 0.484375, the portion of the second error term distributed to the pixel at position (n−1, l+1) is about 0.12109375, the portion of the second error term distributed to the pixel at position (n, l+1) is about 0.2421875 and the portion of the second error term distributed to the pixel at position (n+1, l+1) is about 0.12109375. In another embodiment, the order in which the pixels are processed is determined using raster scanning. In another embodiment, the order in which the pixels are processed is determined using serpentine scanning. In another embodiment, the output of the quantizer is operatively connected to a device used to print the image. In another embodiment, the system includes a memory element, including a storage location for at least some of the pixels in the plurality of pixels of an image, wherein the portion of the second error term distributed to a particular pixel is added to contents of the designated storage location of that particular pixel.

BRIEF DESCRIPTION OF THE DRAWINGS

The foregoing and other objects, features and advantages of the present invention, as well as the invention itself, can be more fully understood from the following description of preferred embodiments, when read together with the accompanying drawings, in which:

FIG. 4 is a block diagram of an embodiment of error distribution coefficients in accordance with the invention.

DETAILED DESCRIPTION

Figure 1:
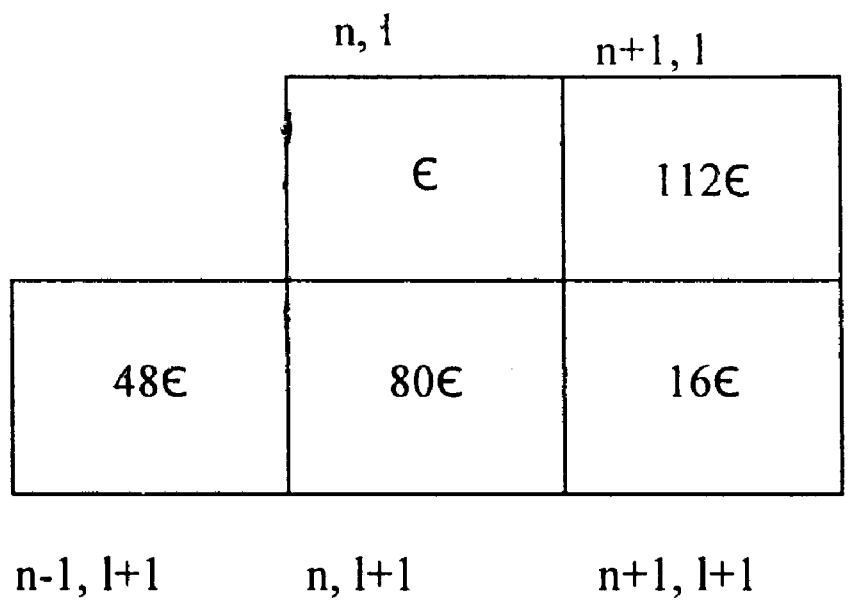
FIG. 1 is a block diagram of error distribution coefficients for a known error distribution method.
Figure 2A:
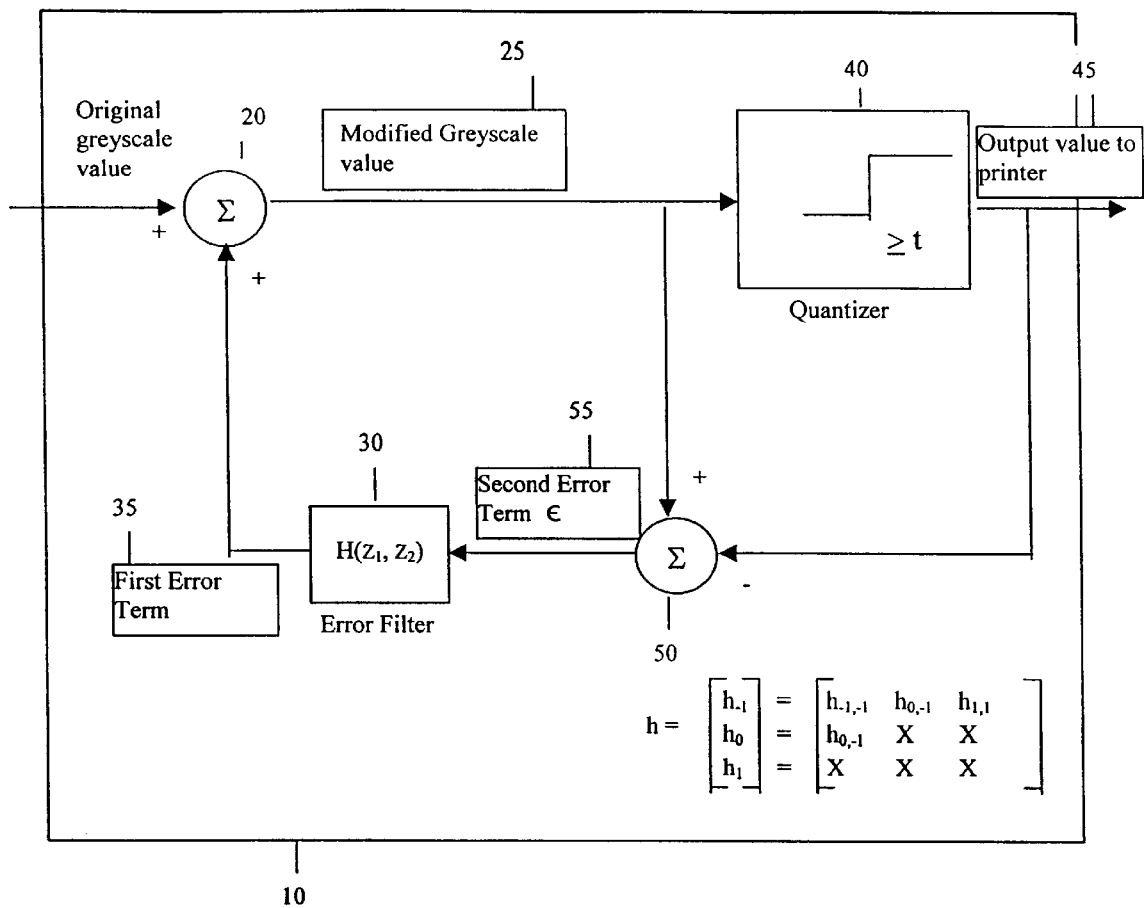
FIGS. 2a and 2b are a block diagram and flow diagram of an embodiment of an error distribution process according to the invention.
Figure 2B:
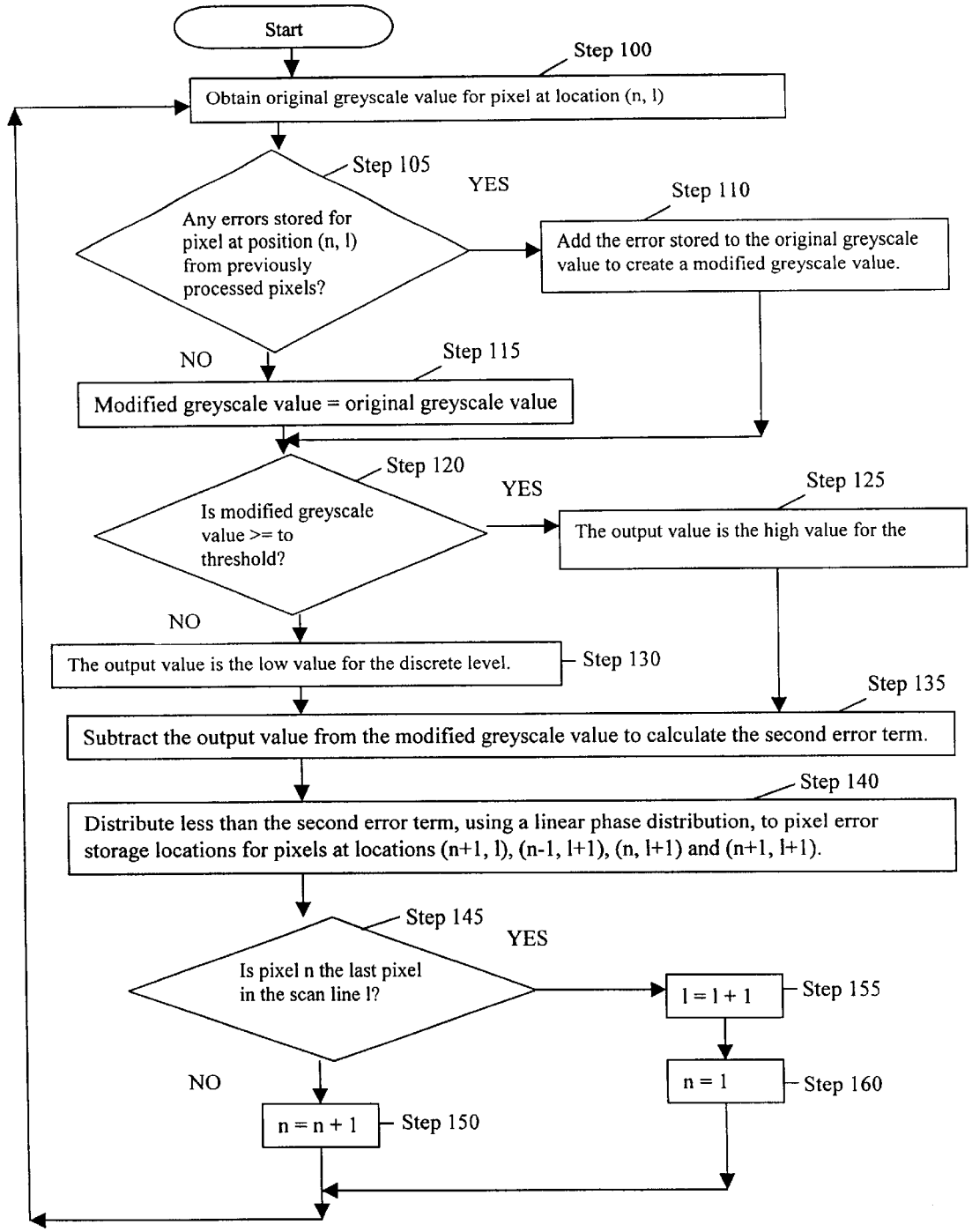

FIGS. 2a and 2b show an error distribution system 10 according to the invention. The system 10 processes an image that is being printed in raster format one pixel at a time. The original greyscale value for each pixel in the image is input (step 100) to the first summing module 20. The summing module 20 adds (step 110) the original greyscale value to a first error term 35. The first error term 35 includes of any error values of previously processed pixels (step 105) that are to be distributed, according to the error filter 30, to the pixel value currently being processed. Thus, for the first pixel of the image, the first error 35 term will be zero (step 115). The output 25 of the first summing module 20 (i.e., the sum of the original greyscale value combined with the first error term) is a modified greyscale value 25 for the currently processed pixel. This modified greyscale value 25 is the input to the quantizer 40. The quantizer 40 compares (step 120) the modified greyscale value 25 to a predetermined threshold.

In an embodiment directed to printing on an ink jet printer, the output 45 of the printer is binary (e.g., the dot is black having a greyscale value of zero or white having a greyscale value of 255). If the modified greyscale value 25 of the pixel is equal to or greater than the threshold value (step 125), the dot is not printed and the output value 45 of the quantizer 40 is the greyscale value of white (255). If the modified greyscale value of the pixel is less than the threshold value (step 130), the dot is not printed and the output value 45 of the quantizer 40 is the greyscale value of black (zero). In an embodiment directed to printing on a laser printer, the output 45 of the quantizer 40 has a limited number of discrete steps associated with the spot size (e.g., four discrete levels in the quaternary case). There is a threshold value for each discrete level, analogous to the foregoing binary output case. If the modified greyscale value 25 of the pixel is equal to or greater than the threshold value associated with that discrete level (step 125), the output 45 of the quantizer 40 is the greyscale value associated with that discrete level. Otherwise (step 130), the output 45 is the greyscale value of the discrete step lower than that level.

The second summing module 50 subtracts (step 135) the output 45 of the quantizer 40 from the input of the quantizer 40. The second summing module 50 outputs 55 this value as the second error term 55. The second error term 55 is the input for the error filter 30. The error filter distributes (step 140) the error to pixels that will be processed subsequent to the pixel currently being processed and printed.

The error distribution system 10 determines (step 145) whether the pixel being processed is the last pixel of the scan line. If the pixel n is not the last, then the system 10 moves (step 150) to the next pixel n+1 in the same scan line l, in the direction of scanning. If the pixel n is the last pixel in the scan line l, then the system moves (step 155) to the next scan line l+1 and starts (step 160) from the beginning of the next line.

In one exemplary embodiment, FIG. 4 shows the distribution (step 140, FIG. 2b) of the second error term 55 to neighboring pixels. The characteristics of the error filter 30 are described in further detail below. As pixels are processed, the second error term 55 that is distributed (step 140) to pixels not yet processed is saved by the distribution system 10. In one embodiment, this unprocessed distribution information is saved as part of the error filter 30. In another embodiment, this unprocessed distribution information is saved using a separate memory element that has a location for at least each of the pixels of the image in close proximity of the pixel currently being processed. When saving, the error distributed (step 140) to a particular pixel is added to any error that was previously added to that particular pixel. When that particular pixel is processed by the error distribution system 10, the error stored for that particular pixel is the first error term 35 that is added to the original greyscale value of that particular pixel, as described above.

As shown, each pixel has a position designated by n for the column and l is the row (i.e., scan line) where the currently processed pixel resides. The size of each row height and each column width is one pixel. The current pixel being processed for this example has a position (n, l). The pixel at location (n+1, l) is the next pixel that is to be processed. This may be to the right or the left of the pixel currently being processed, at location (n, l), depending on the type of scanning sequence being used.

Figure 3A:
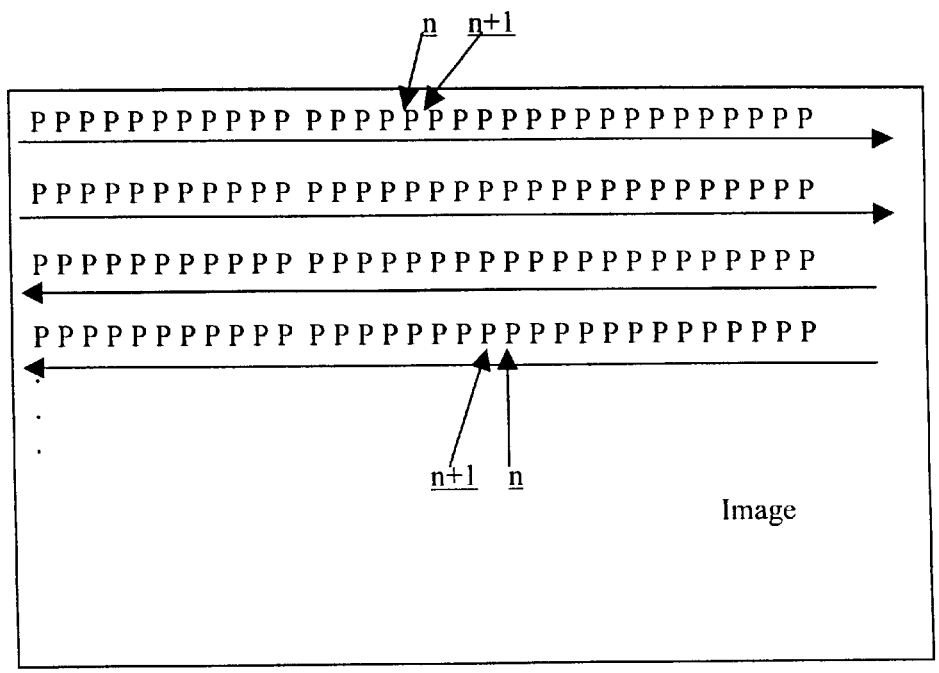
FIGS. 3a and 3b are block diagrams representing examples of sequences.

For example, the system 10 can use raster or serpentine scanning sequences. Serpentine scanning, as shown in FIG. 3a (where P represents the pixels in the image), is a scanning sequence wherein the document is scanned two rows right to left and then the next two rows left to right. This alternating pattern is repeated until the scan is complete.

Figure 3B:
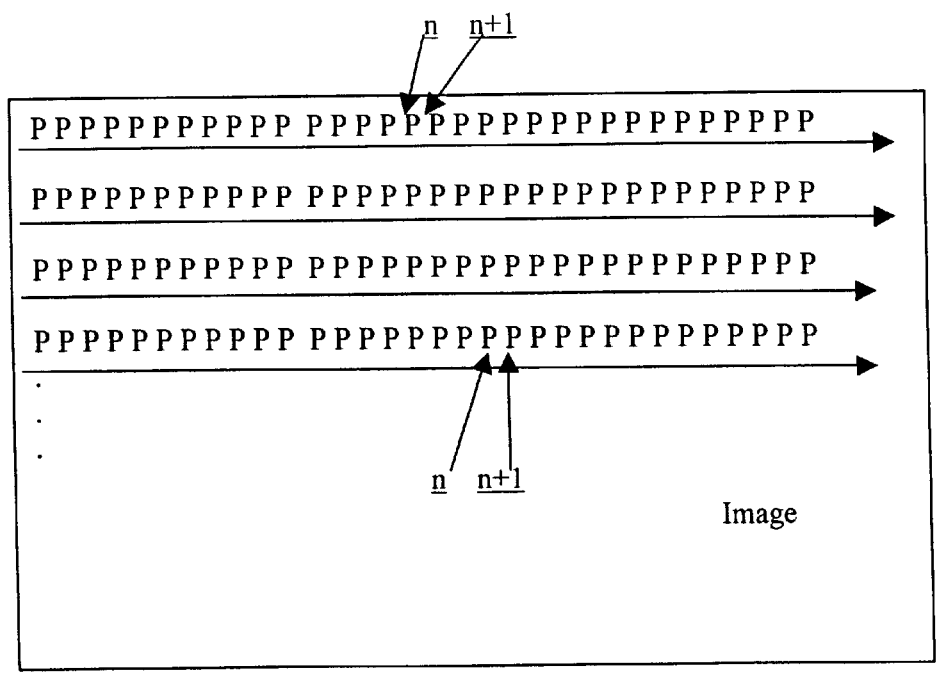

Therefore, the n+1 pixel is in the direction that the current row l is being scanned. Raster scanning, as shown in FIG. 3b (where P represents the pixels in the image), is a scanning sequence wherein the document is scanned from the right to left each row, starting with the top row and continuing down until the scan is complete. For this type of scanning, the n+1 pixel is to the right (east) of the currently processed pixel (n, l). The next row, l+1, is below (south) the currently processed pixel. If the pixel being processed is the last pixel of the scan line then the error that is to be distributed to the pixel at n+1 is not distributed to any pixel in the image and is lost. Similarly, when the pixel being processed is in the last scan line of the image, any error that is to be distributed to the next scan line l+1 is not distributed to any pixel in the image and is lost.

In the embodiment represented in FIG. 4, the distribution coefficients have been normalized over 256 and ε represents the value of the second error term. Thus, the portion of the second error term distributed to the pixel at location (n+1, l) is 124/256 or 0.484375 of the second error term. The portion of the second error term distributed to the pixel at location (n−1, l+1) is 31/256 or 0.12109375 of the second error term. The portion of the second error term distributed to the pixel at location (n−1, l+1) is 62/256 or 0.2421875 of the second error term. The portion of the second error term distributed to the pixel at location (n+1, l+1) is 31/256 or 0.12109375 of the second error term.

This distribution embodies two important elements of the invention. First, the error filter 30 is lossy. Error distribution is lossy when something less than the total error is distributed. In the exemplary embodiment of FIG. 4, the sum of the distribution coefficients is 0.96875. Thus, only about 97% of the error is distributed to the surrounding pixels. Making the error filter 30 lossy reduces the spatial extent of distributed errors relative to error filters in the prior art. It is known that error filters in the prior art are non lossy.

Second, the part of the error filter 30 which is used to propagate errors to pixels of scan line l+1 has linear phase characteristics. Specifically, the group delay of the filter response is constant at all input signal frequencies. The group delay of a filter is a measure of the average delay of the filter in producing an output signal in response to an input signal as a function of input signal frequency. For more information on the characteristics of linear phase filters, reference is made to the book by Alan W. Oppenheim and Ronald W. Schafer entitled "Digital Signal Processing." In the spatial domain, the directional properties of distributed errors are independent of image pixel values which improves their isotropic properties. In the exemplary embodiment of FIG. 4, this is accomplished by keeping the distribution of error to the pixels on each side of the pixel at location (n, l+1) symmetric. The errors distributed to both the pixel at location (n−1, l+1) and the pixel at location (n+1, l+1) are equal (e.g., 31/256 or 0.12109375). The error filter 30 also propagates the error equally in the vertical and horizontal directions (i.e., symmetrically). The error distributed to the pixel at position (n+1, l) equals the sum of the error distributed to pixels at locations (n−1, l+1), (n, l+1) and (n+1, l+1) (e.g. 124/256 or 0.484375). A linear phase distribution causes the effects of error to appear equally throughout the printed image and does not become localized or concentrated in a particular region or regions or the image. Combining a linear phase filter with a lossy filter eliminates the random patterns and worms that are detectable to the human eye and allows a printed image that is much closer to the greyscale of the original image without problems that distort the image.

In another embodiment, the error filter may additionally be set up using finite impulse response ("FIR") control techniques. Using a FIR filter allows both controllability and predictability of the error distribution. It should be understood that the present invention may be accomplished with software, hardware or a combination of hardware and software.

Equivalents

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of diffusing error caused by quantizing each pixel within an image formed of a plurality of pixels, each pixel representing a greyscale value of the image at a location (n, l) within the image, and having an original greyscale value associated therewith, the method comprising:

(a) adding to the original greyscale value of a pixel having a position (n, l) within the image a first error term resulting from quantization of previously processed pixels to derive a modified greyscale value;

(b) comparing the modified greyscale value of the pixel with a threshold to select an output value representing the pixel;

(c) calculating a second error term having a value that is the difference between the output value and the modified greyscale value;

(d) distributing the second error term to a preselected plurality of neighboring pixels at positions (n+1, l), (n−1, l+1), (n, l+1), (n+1, l+1) using a linear phase filter algorithm having a set of distribution coefficients with a sum less than one, wherein one of the coefficients within the set of coefficients is combined with the second error term for each pixel position; and (e) repeating steps (a)–(d) for each pixel within the image.

2. The method of claim 1 wherein the linear phase filter algorithm uses finite impulse response techniques.

3. The method of claim 1 wherein the combining of one coefficient with the second error term for each pixel position is accomplished by multiplying each coefficient by the second error term.

4. The method of claim 1 wherein the portion of the second error term distributed to the pixel at position (n+1, l+1) equals the portion of the second error term distributed to the pixel at position (n−1, l+1).

5. The method of claim 4 wherein the portion of the second error term distributed to the pixel at position (n−1, l+1) combined with the portion of the second error term for the pixel at position (n+1, l+1) equals the portion of the second error term for the pixel at position (n, l+1).

6. The method of claim 5 wherein the portion of the second error term distributed to the pixel at position (n+1, l) equals the sum of the portion of the second error term of the pixel at position (n+1, l+1) combine d with the portion of the second error term of the pixel at position (n, l+1) and combined with the portion of the second error term of the pixel at position (n−1, l+1).

7. The method of claim 6, wherein the portion of the second error term distributed to the pixel at position (n+1, l) is about 0.484375, the portion of the second error term distributed to the pixel at position (n−1, l+1) is about 0.12109375, the portion of the second error term distributed to the pixel at position (n, l+1) is about 0.2421875 and the portion of the second error term distributed to the pixel at position (n+1, l+1) is about 0.12109375.

8. The method of claim 1 wherein the order in which the pixels are processed is determined using raster scanning.

9. The method of claim 1 wherein the order in which the pixels are processed is determined using serpentine scanning.

10. A method of diffusing error caused by quantizing each pixel within an image formed of a plurality of pixels, each pixel representing a greyscale value of the image at a location within the image, and having an original greyscale value associated therewith, the method comprising:

(a) adding to the original greyscale value of a pixel having a position (n, l) within the image a first error term resulting from quantization of previously processed pixels to derive a modified greyscale value;

(b) comparing the modified greyscale value of the pixel with a threshold to select an output value representing the pixel;

(c) calculating a second error term having a value that is less than the difference between the output value and the modified greyscale value;

(d) distributing the second error term to a preselected plurality of neighboring pixels at positions (n+1, l), (n−1, l+1), (n, l+1), (n+1, l+1), wherein the portion of the second error term distributed to the pixel at position (n+1, l+1) equals the portion of the second error term distributed to the pixel at position (n−1, l+1), and the portion of the second error term distributed to the pixel at position (n−1, l+1) combined with the portion of the second error term for the pixel at position (n+1, l+1) equals the portion of the second error term for the pixel at position (n, l+1), and the portion of the second error term distributed to the pixel at position (n+1, l) equals the sum of the portion of the second error term of the pixel at position (n+1, l+1) combined with the portion of the second error term of the pixel at position (n, l+1) and combined with the portion of the second error term of the pixel at position (n−1, l+1); and (e) repeating steps (a)–(d) for each pixel within the image.

11. The method of claim 10 wherein the order in which the pixels are processed is determined using raster scanning.

12. The method of claim 10 wherein the order in which the pixels are processed is determined using serpentine scanning.

13. The method of claim 10 wherein the portion of the second error term distributed to the pixel at position (n+1, l) is about 0.484375, the portion of the second error term distributed to the pixel at position (n−1, l+1) is about 0.12109375, the portion of the second error term distributed to the pixel at position (n, l+1) is about 0.2421875 and the portion of the second error term distributed to the pixel at position (n+1, l+1) is about 0.12109375.

14. An apparatus for diffusing error caused by quantizing each pixel within an image formed of a plurality of pixels, each pixel representing a greyscale value of the image at a location (n, l) within the image, and having an original greyscale value associated therewith, the apparatus comprising:

a first summing module for adding to the original greyscale value of a pixel having a position (n, l) within the image a first error term resulting from quantization of previously processed pixels to derive a modified greyscale value;

a second summing module operatively connected to the output of the first summing module and the output of the quantizer for calculating a second error term having a value that is less than the difference between the output value and the modified greyscale value;

a quantizer operatively connected to the output of the first module comparing the modified greyscale value of the pixel with a threshold to select an output value representing the pixel; and an error filter module operatively connected to the input of the first summing module and the output of the second summing module for distributing the second error term, to preselected plurality of neighboring pixels at positions (n+1, l), (n−1, l+1), (n, l+1), (n+1, l+1) using a linear phase filter algorithm having a set of distribution coefficients with a sum less than one, wherein one of the coefficients within the set of coefficients is combined with the second error term for each pixel position.

15. The apparatus of claim 14 wherein the linear phase filter algorithm of the error filter module uses finite impulse response techniques.

16. The apparatus of claim 14 wherein the combining of one coefficient with the second error term for each pixel position is accomplished by multiplying each coefficient by the second error term.

17. The apparatus of claim 14 wherein the error filter module further distributes the second error term such that the pixel at position (n+1, l+1) equals the portion of the second error term distributed to the pixel at position (n−1, l+1).

18. The apparatus of claim 17 wherein the error filter module further distributes the second error term such that the pixel at position (n−1, l+1) combined with the portion of the second error term for the pixel at position (n+1, l+1) equals the portion of the second error term for the pixel at position (n, l+1).

19. The apparatus of claim 18 wherein the error filter module further distributes the second error term such that the pixel at position (n+1, l) equals the sum of the portion of the second error term of the pixel at position (n+1, l+1) combined with the portion of the second error term of the pixel at position (n, l+1) and combined with the portion of the second error term of the pixel at position (n−1, l+1).

20. The apparatus of claim 19 wherein the error filter module further distributes the second error term to preselected plurality of pixels, including pixels at positions (n+1, l), (n−1, l+1), (n, l+1), (n+1, l+1), such that the portion of the second error term distributed to the pixel at position (n+1, l) is about 0.484375, the portion of the second error term distributed to the pixel at position (n−1, l+1) is about 0.12109375, the portion of the second error term distributed to the pixel at position (n, l+1) is about 0.2421875 and the portion of the second error term distributed to the pixel at position (n+1, l+1) is about 0.12109375.

21. The apparatus of claim 14 wherein the order in which the pixels are processed is determined using raster scanning.

22. The apparatus of claim 14 wherein the order in which the pixels are processed is determined using serpentine scanning.

23. The apparatus of claim 14 wherein the output of the quantizer is operatively connected to a device used to print the image.

24. The apparatus of claim 14 further comprising:

a memory element, including a storage location for at least some of the pixels in the plurality of pixels of an image, wherein the portion of the second error term distributed to a particular pixel is added to contents of the designated storage location of that particular pixel.

* * * * *